United States Patent [19]

Bhattacharya

[11] Patent Number: 4,907,170
[45] Date of Patent: Mar. 6, 1990

[54] INFERENCE MACHINE USING ADAPTIVE POLYNOMIAL NETWORKS

[75] Inventor: Bishnu P. Bhattacharya, Claremont, Calif.

[73] Assignee: General Dynamics Corp., Pomona Div., Pomona, Calif.

[21] Appl. No.: 248,838

[22] Filed: Sep. 26, 1988

[51] Int. Cl.⁴ .............................................. G06F 15/18
[52] U.S. Cl. ................................... 364/513; 364/149; 364/187
[58] Field of Search ............... 364/513, 300, 200, 900, 364/187, 149, 150, 151

[56] References Cited

U.S. PATENT DOCUMENTS

| 3,596,258 | 7/1971 | Choate et al. | 364/200 |
| 3,702,986 | 11/1972 | Taylor et al. | 364/200 |
| 3,715,730 | 2/1973 | Smith et al. | 364/200 |
| 3,725,653 | 4/1973 | Carr et al. | 364/187 |
| 4,042,923 | 8/1977 | Merrick | 343/15 |
| 4,249,238 | 3/1981 | Spang, III et al. | 364/431 |
| 4,528,565 | 7/1985 | Hauptmann | 364/577 |
| 4,774,677 | 9/1988 | Buckley | 364/513 |
| 4,777,585 | 10/1988 | Kokawa et al. | 364/513 |

FOREIGN PATENT DOCUMENTS

| 378802 | 7/1973 | U.S.S.R. | 364/151 |
| 1167618 | 1/1984 | U.S.S.R. | 364/577 |
| 1171807 | 3/1984 | U.S.S.R. | 364/577 |

Primary Examiner—Allen MacDonald
Attorney, Agent, or Firm—Henry M. Bissell; Leo R. Carroll

[57] ABSTRACT

An inference machine is described which comprises an adaptive polynomial network with the capability of implicitly inferring missing input information contained in time-dependent signals. The proposed network has wide applicability and is characterized by its ability to produce outputs within specified degrees of accuracy when, for example, only four out of ten input signals are available to the network. Specific applications include terminal guidance of a tactical missile when critical signals may be denied. A generic implementation is schematically illustrated.

12 Claims, 3 Drawing Sheets

BEST AVAILABLE COP
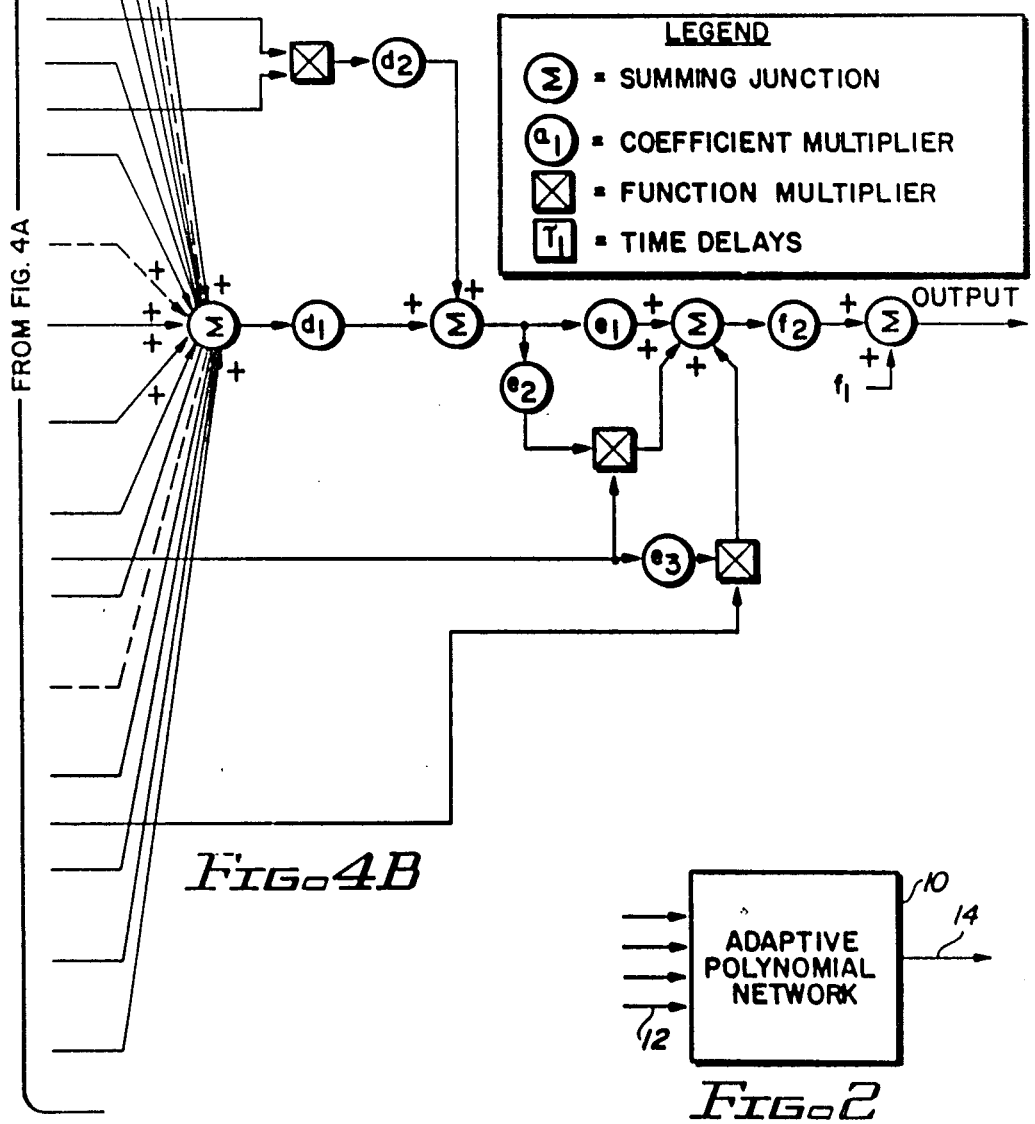
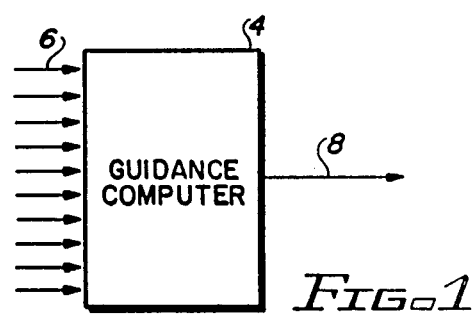
Fig.1
LEGEND
- Σ = SUMMING JUNCTION
- $a_1$ = COEFFICIENT MULTIPLIER
- ⊠ = FUNCTION MULTIPLIER
- $T_1$ = TIME DELAYS
Fig.4B
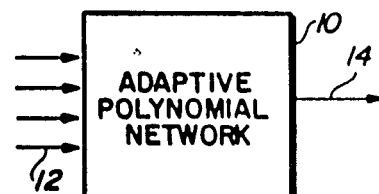
Fig.2

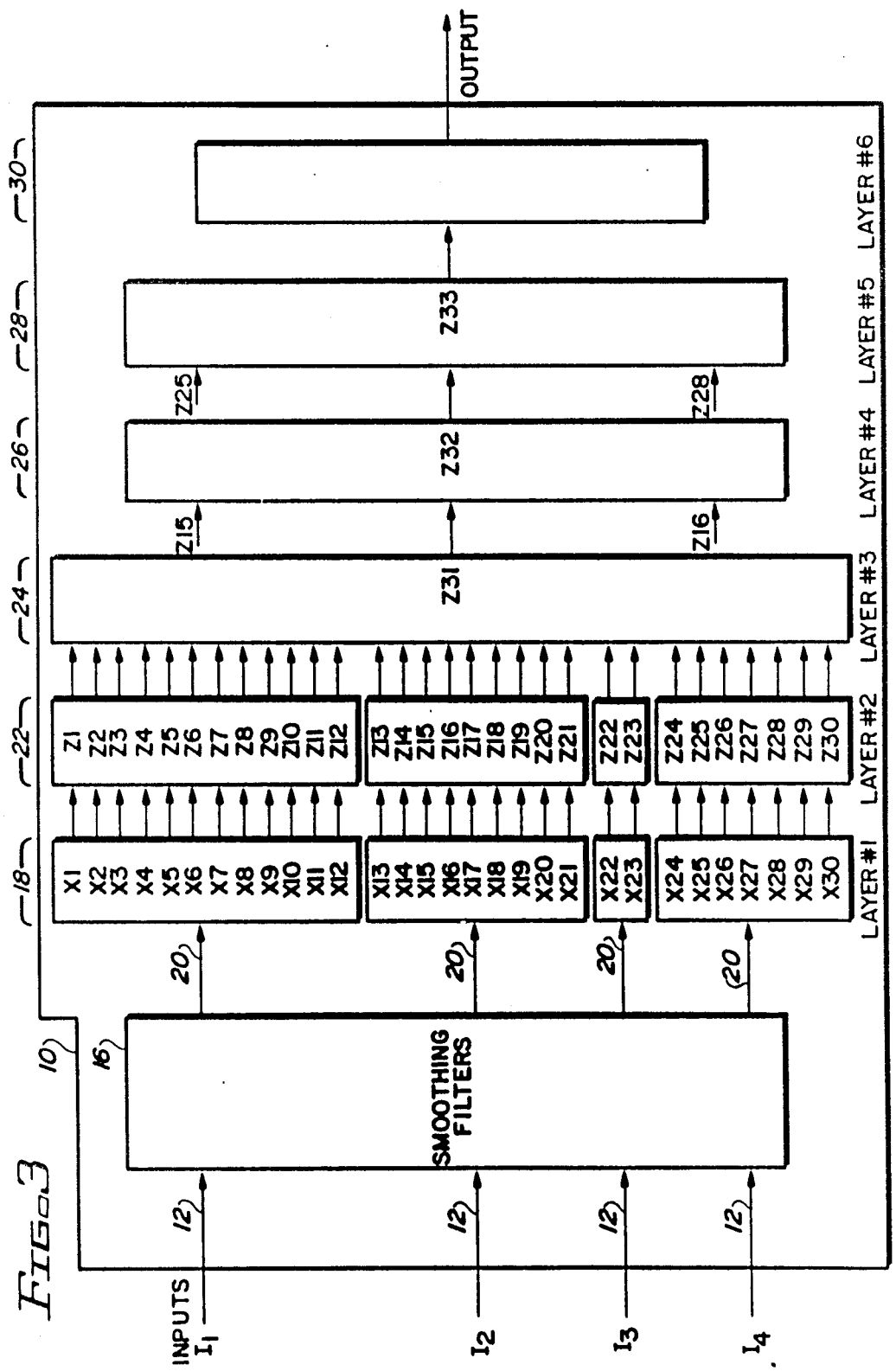

INFERENCE MACHINE USING ADAPTIVE POLYNOMIAL NETWORKS

BACKGROUND OF THE INVENTION

1. Field of the Invention.

This invention relates to apparatus and methods of enabling the implicit inference of missing information contained in time-dependent signals and, more particularly, to such apparatus and methods used in applications such as the terminal guidance of tactical missiles when critical signals may be denied.

2. Description of the Related Art.

An adaptive polynomial network is an ordered structure of physically realizable algebraic functions arranged in a manner that gives certain information processing properties to the overall network. Depending on the specific application, such properties may be viewed as "artificial intelligence" attributes of the constructed network.

Polynomial descriptions form the basis of the polynomial theory of complex systems. The polynomial description of a complex system or of a component is obtained by observing inputs and outputs during a comparatively short time. The central problem solved by the polynomial theory is to arrive at the polynomial description which has optimum complexity, namely, that which is sufficient to describe the complexity of the plant.

Polynomial descriptions have distinct advantages in engineering. There is no need to find solutions for the equations in finite difference form because all the relevant questions can be answered from the polynomial description itself. In polynomial theory there is no distinction made between static and dynamic states of the system being described.

Some examples of the related art are described briefly below.

U.S. Pat. No. 2,249,238 to Spang et al disclosed an improved gas turbine engine control system which maintains a selected level of engine performance despite the failure or abnormal operation of one or more engine parameter sensors. Estimate signals are calculated on-line from an analytical steady-state model of the gas turbine engine control system stored in a computer. The estimate signals are transmitted to a control computational unit which uses them in lieu of the actual engine parameter sensor signals to control the operation of the engine. The estimate signals are also compared with the corresponding actual engine parameter sensor signals and the resulting difference signals are utilized to update the engine model.

Devices such as the one described by Spang et al are well known in control literature as "model reference adaptive systems," in which a theoretical model (mathematical) of a plant is used to generate corrective control signals should the actual dynamics of the plant undergo radical changes, such as when unforeseen interruptions occur.

U.S.S.R. Patent 378802 to Ivakhnenko et al relates to a technique for modifying the input signal to a plant n the event of signal failure or plant interruption. An error signal is generated using a set of comparator and differentiator circuits.

The technique described in Soviet Patent 378802 is commonly known as a "signal-reference adaptive technique". It applies to a signal-input single-output system.

U.S.S.R. Patents S.U. 1167-618-A to Krom'er et al and S.U. 1171807-A to Anisimov et al are both mechanizations of elementary interpolation formulas with no adaptive features.

U.S. Pat. No. 4,528,565 to Hauptmann again utilizes the mechanization of simple interpolations when received discrete signal amplitudes deviate from adjacent pulse amplitudes. The particular application involved is a pulse Doppler radar receiver. U.S. Pat. No. 4,042,923 to Merrick also falls in the same category, in an application involving a radar position locator system using a mobile and at least two stationary transceivers. Signals are validated by being stored and compared with previously received signals. If the comparison indicates that the received signal is within a range of a reasonably possible change, as compared to the previously received signals, it is accepted. Otherwise, it is rejected and the memory circuit which stored the signal for validation is backed up to the last previously stored valid signal.

None of the patents described above discloses a method or apparatus in which no explicit interpolation or reconstruction is involved. None of them discloses a "trained" network which infers the effects of a continuously missing array of inputs and generates the outputs autonomously. It would be a great advancement in the art if a truly general-purpose multi-input/multi-output machine that uses no memory units, comparators, or interpolators were developed which was adaptable to diverse applications.

SUMMARY OF THE INVENTION

The present invention is a type of adaptive polynomial network with a structure that provides the capability of inferring missing input information. For example, if the appropriate values of the outputs of an information processor depend upon the past and present values of ten independent inputs, then the adaptive polynomial network of the present invention will provide outputs, within specified degrees of accuracy, with only four out of the ten inputs by "inferring" the missing information contained in the six denied inputs. The present invention has general applicability to many fields but is described herein in a specific application to the problem of semi-active missile terminal guidance.

A missile guidance system requiring ten inputs which are time-dependent signals, and having two outputs to the autopilot of the missile is represented by a physically realizable ordered structure of algebraic functions. The adaptive network, or inference machine, representing the missile guidance system produces outputs which are identical to the guidance system although some of the input signals are identical to the guidance system although some of the input signals are missing. The missing missile inputs may be denied or may be unavailable to the guidance computer, as could conceivably happen in tactical situations. Principal among the possible denied information are the missile-to-target range, the time rate of change of this range information, time-to-go estimates, and a specially computed signal that compensates for radome aberration effects. The inference machine is designed so that its output signals have spectral characteristics identical to the actual guidance system when the input signals common to both are the same.

The network structure comprises seven layers, each layer representing an algebraic relationship between its input and output quantities. The first layer represents a recursive smoothing filter whose function is to eliminate high-frequency noise which is normally present in the input signals. The second layer represents functions that scan the past history of each signal and retrieve the values of each signal at specified time intervals that are integer multiples of one computational cycle time. The succeeding five layers have simple algebraic structures whose outputs are linear transformations of their inputs. The coefficients of the linear transformations are determined by "training" by use of special software and a six-degrees-of-freedom simulation of missile dynamics to generate a knowledge base. The procedure is repeated for a second output channel, the two outputs representing the missile guidance signals generated for control of the tail deflections, via an autopilot, in the two planes of a cruciform missile.

The inference engine is physically realizable by diverse means such as electronic circuitry, computer architecture, mechanical devices, and so forth. The simplicity of the mathematical relationships involved allows for numerous ways of devising physical embodiments for the required expressions. Elementary electronic analog components such as adders and coefficient and function multipliers can be arranged to realize the network of this invention. The apparatus can be fabricated as a microprocessor chip for the most efficient use of limited space.

BRIEF DESCRIPTION OF THE DRAWING

A better understanding of the present invention may be realized from a consideration of the following detailed description, taken in conjunction with the accompanying drawing in which:

FIG. 1 is a block diagram of a missile guidance system;

FIG. 2 is a block diagram of an adaptive polynomial network in accordance with the present invention which simulates the system of FIG. 1;

FIG. 3 is a schematic block diagram of the network of FIG. 2 showing details of the layer structure.

FIG. 4 is shown on two seperate sheets of drawing as FIGS. 4A and 4B, respectively.

DESCRIPTION OF THE PREFERRED EMBODIMENT

Figure 4A:
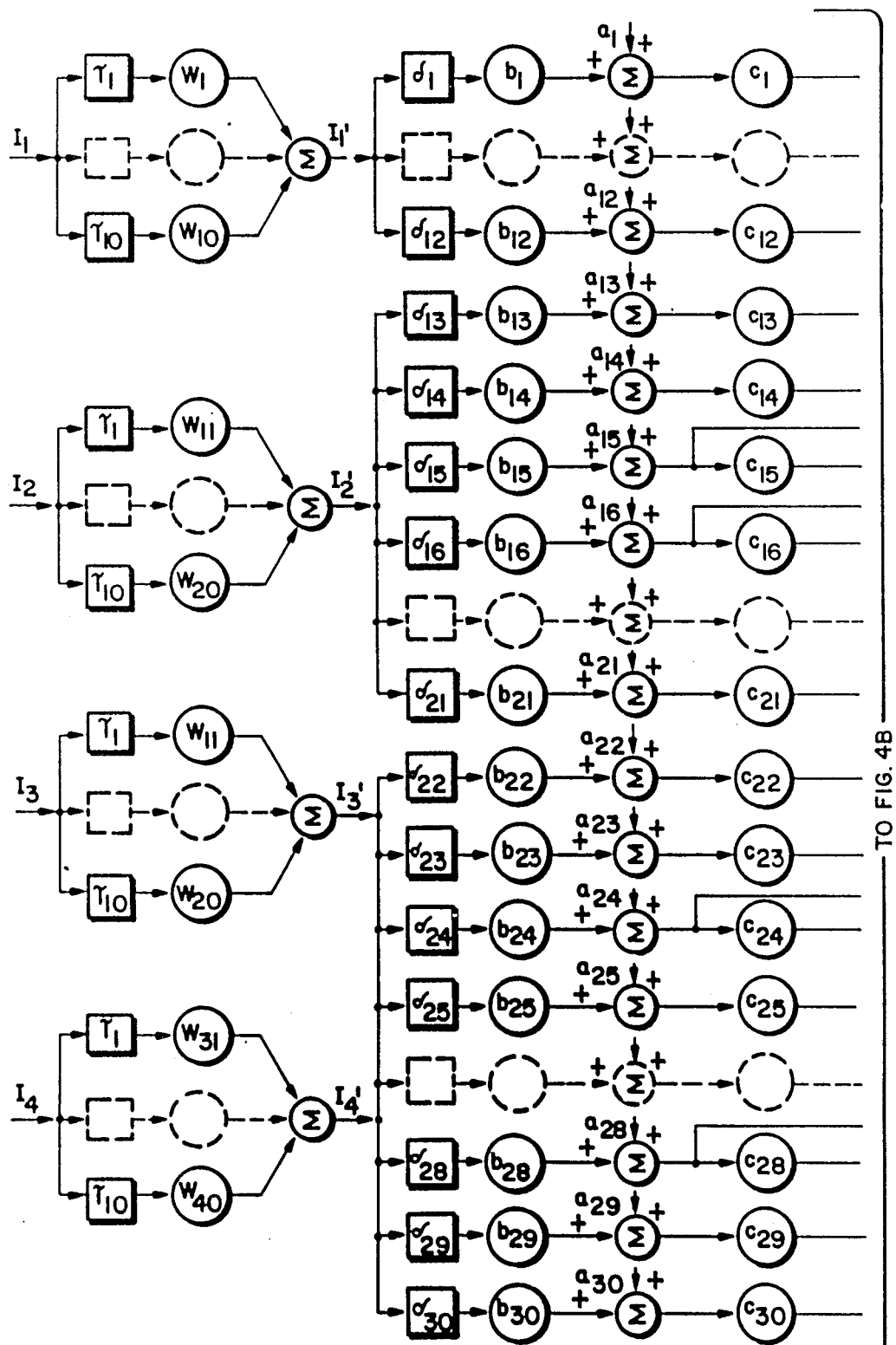
FIG. 4 is a schematic diagram of an embodiment of the network of FIG. 3 using generic components.

The description of a dynamical system by an adaptive polynomial network is in sharp contrast to the state-variable approach using differential equations. Control theory based on differential equations is often inadequate for solving the problems of real life complex systems. The problem of constructing and solving differential equations to trace the input-output paths of a complex system soon becomes insuperably difficult. Rather than using a deductive deterministic method, it is more appropriate to employ a heuristic self-organizational approach. The self-organizational approach utilizes mathematical combinatorial methods and a series of threshold self-selections based on various heuristic criteria. For general background information in this area the book entitled "Self-Organizing Methods in Modeling GMDH Type Algorithms", edited by S. J. Farlow (Marcel Decker, Inc., 1984) is cited. Also the article by A. G. Ivakhnenko entitled "Polynomial Theory of Complex Systems" in IEEE Transactions on Systems, Man, and Cybernetics, Vol. SMC-1, No. 4, October 1971, is cited as the fundamental reference work.

Briefly, the approach enunciated in this article is as follows:

The input-output relationship of a complex system is fitted by a high-degree multinonmial using a multilayered network structure. Thresholds are employed at each layer in the network to identify those polynomials which give the best fit to the input-output relationship. Only the best combinations of the input properties are allowed to pass to succeeding layers where more complex combinations are formed. Each element in each layer in the network implements a nonlinear function whose coefficients are determined by a regression technique which enable each element to approximate the true output with minimum mean-square error. The experimental data base is divided into a training set and a testing set. The training set is used to obtain the element coefficients, and the testing set is used to determine the utility of a given element in the network and to control overfitting of the experimental data. The advantages of using a multilayered structure to solve complies problems are (1). a smaller training set of data is required;
(2). the computational burden is reduced;
(3). the procedure automatically filters input properties which provide little information about the input-output relationship; and
(4). a multilayered structure provides a computationally feasible way to implement multinominals of very high degree.

A useful analogy to the heuristic self-organization approach is the selective cultivation of botanical plants. To obtain plants with certain desired characteristics, a number of generations (seeds) of those plants are selected in which the properties of interest are more pronounced. At first a large number of plants are grown which may have the desired property. Then the first crossing occurs in a generation of combinations of first complexity, followed by the first harvest. The harvest of the first generation corresponds to the first threshold self-selection, in which certain plants are chosen which are closer to the requirements than others. The seeds of these selected plants are again sown, and the plants are crossed again in a generation of combinations of second complexity. From the second harvest the seeds of certain plants are again chosen (the second threshold self-selection), et cetera, et cetera.

Two rules of the selection process are found:

(1). for each generation there exists a certain optimal number of seeds being sown. Any deviation from this number results in the deceleration and deterioration of the selection process.
(2). The selection process takes more than a single generation to complete. Usually at least three or four are needed. If there are too many generations in the selection process, the plants degenerate. The more complicated the selection problem, however, the more generations are needed.

Another example of the application of polynomial description of complex processes is a "perceptron". The "perceptron" is a pattern recognition machine based on an analogy to the human nervous system, capable of learning by means of a feedback system which reinforces correct answers and discourages wrong ones. A perceptron-type algorithm can fully duplicate all the main principles of selection. For example, a perceptron can be used to identify the optimal values of plant parameters in the control theory sense. A complex extremal surface is approximated by polynomials; the signals supplied to the perceptron contain information about the surface of interest, which is usually described by a number of experimental points and simple functions of their coordinates ("elemental algorithms").

First, in accordance with the selection hypothesis, simple polynomials are chosen that are easiest to inscribe in the surface. These simple combinations of data are subjected to the first threshold selection, and only some of the polynomials (those which best fit into the desired surface) survive into the second layer. There they form more complex combinations (polynomials of higher degree). From the second "generation" a most suitable polynomial is again singled out for the best fit into the desired surface. An optimum number of combinations is again selected and only those pass into the third layer, where even more complex third-generation combinations are formed (polynomials of even higher degree), and so on. This constitutes the "group method of data handling" for the problem under consideration.

In complex problems, just as in the selection of botanical plants, at least three of four layers are needed to arrive at satisfactory results. If too many layers are used, the combinations degenerate as indicated by an accuracy check in the form of a correlation criterion or mean-square-error criterion on the independent testing data set. To prevent degeneration, the best solution must be chosen based on data from all layers of the network, and not just on the results of the last layer.

Against the general background of the group method of data handling which has been used previously in the simulation of complex systems as described at some length above, the focus in what follows narrows to the consideration of an inference machine using adaptive polynomial networks in accordance with the present invention.

A structure in accordance with the present invention belongs to a sub-class of adaptive polynomial networks, a member of which manifests the capability to "infer" missing information. The present invention has extremely wide applicability to many diverse fields such as robotics, econometric modelling and forecasting, medical electronics, electrical networks, communication networks, and computer networks. The generic name of "Inference Machine" may be given to all such physical arrangements in accordance with the present invention in which missing information contained in certain inputs denied to a polynomial network are inferred to produce network outputs which are within specified degree of accuracy despite the absent inputs.

A specific application for which an inference machine will be described herein is for semi-active missile terminal guidance. The particular type of cruciform missile being guided is controlled by missile guidance signals for the tail deflections in two planes via an autopilot.

In FIG. 1 the missile guidance system is represented by a simple rectangular block 4 with lines on its left representing various signals 6 needed for normal successful operation. These signals 6, which carry time-dependent quantitative information to the missile guidance computer 4, are designated as "inputs." Lines on the right-hand side of the block represent the "outputs" 8 of the guidance computer 4. These are time-dependent electrical signals which are conveyed to the autopilot of the missile.

The block diagram shown in FIG. 2 depicts an adaptive polynomial network 10 designed to mimic the guidance computer 4 of FIG. 1. Network 10 has inputs 12 and output 14. The difference between the blocks in FIG. 1 and FIG. 2 is that some of the input signals 6 of FIG. 1 are missing in FIG. 2 even though the outputs 8 and 14 are identical. The missing missile inputs may be denied or may be unavailable to the guidance computer, as could conceivably happen in tactical situations. Principal among the possible denied information are missile-to-target range, the time rate of change of range information, time-to-go estimates, and a specially computed signal that compensates for radome aberration effects. The physically realizable ordered structure of algebraic functions that the block 10 in FIG. 2 comprises is so designed that the output signals 14 of this block will have spectral characteristics identical to output signals 8 of the block 14 of FIG. 1 provided that the common signals that serve as inputs to both blocks have the same time dependencies. The outputs 8 and 14 shown in FIGS. 1 and 2 correspond to just one of the two planes of tail deflection for the guided cruciform missile.

The details of the network structure of the block in FIG. 2 are shown in FIG. 3. There are seven layers, each layer representing an algebraic relationship between its input and output quantities. The first layer represents a recursive smoothing filter 16 whose function is to eliminate high-frequency noise that is normally present in the input signals 12. The mathematical basis for the structure of this and all the following layers is elaborated in the Appendix. The second layer 18 is composed of computational units 20 which represent functions that scan the past history of each signal and retrieve the values of each signal at specified time intervals, viz.at integer multiples of one computational cycle time. These values are designated by numbered vectors such as $x_1$, $x_2$, $x_3$, etc. The succeeding five layers 22, 24, 26, 28, and 30 have simple algebraic structures which perform linear transformations on the inputs. Thus, the output values $z_1$-$z_{30}$ of the algebraic structures 22 are the specific linear transformations given in the Appendix of the input values $x_1$-$x_{30}$ from the first layer 18.

The manner of determining the coefficients of the linear transformation given in an Appendix is unique and involves "training" by use of special software and a six-degrees-of-freedom simulation of the missile dynamics that generates a knowledge base. Once the coefficients have been determined by the training software by making use of the simulation of the actual physical system, the end result is an inference machine 10 which is physically realizable by diverse means such as electronic circuitry, computer architecture, mechanical devices, etc.

The procedure just described for signal transference is repeated for the second guidance output channel, the two of them representing the missile guidance commands generated for control of the tail deflections, via the autopilot, in the two planes of a cruciform missile.

As described above, the procedure for successive transformation of the input signals results in outputs that have spectral properties identical to the outputs of the block representing the guidance computer with all of its input information available. The advantages of the present invention is that the same outputs are obtained even when a number of inputs are denied. The network infers, in a sense, these inputs and acts upon the missing information autonomously.

It is obvious from the simplicity of the mathematical relationships described in the Appendix that there could be numerous ways of devising physical embodiments of those expressions. Elementary electronic analog components such as adders, coefficient and function multipliers, and so forth could be arranged to realize the network described in this invention. A generic embodiment using such components is illustrated in FIG. 4. The apparatus shown schematically in FIG. 4 could be embodied as electrical circuitry on a microprocessor chip for extremely efficient use of limited space. The present invention encompasses any physical embodiment constructed according to the principles described and explained above.

In FIG. 4, the various components are denoted as follows. A large circle with a capital "sigma" inside it represents a summing junction whose output value is equal to the sum of its input values. A small circle with a coefficient inside denotes a coefficient multiplier whose output value is equal to the product of the input value and the coefficient inside the circle. A square box with the multiplication sign "X" inside it is a function multiplier which produces as its output the product of the functions appearing at its inputs. A square with either a lower-case "tau" or lower-case "delta" inside it corresponds to a time delay. Thus, for example, $\tau_1$ is a delay of 9T and $\delta_6$ is a delay of 6T, where T is the sampling time interval. The circles or squares in FIG. 4 which are formed with broken lines indicate ellipses of the components in numerically ordered sequences.

The sequence of steps leading to the adaptive polynomial network of FIG. 3 and its implemented embodiment (FIG. 4) can be described as follows. First, the physical system, in this case a missile and the guidance computer, must be simulated. A validated six-degree-of-freedom simulation program was exercised for different engagement scenarios corresponding to diverse flight conditions, target maneuvers, and so forth. The simulation program prints out parameters corresponding to the inputs and outputs of the guidance computer it simulates. Sixty different sets of exercise data were produced in an effort to amass as realistic a data base as possible. The data base consisting of all inputs and outputs of the simulation program for the 60 exercise cases becomes the starting point for "training" the adaptive polynomial network of FIG. 2.

A "training" program is used to train the adaptive polynomial network to yield appropriate outputs with some of the inputs deliberately denied. The complex and sophisticated software of the training program fits the data base to a hypothetical polynomial by assuming values for the coefficients and checking the output. If the output is unsatisfactory, the coefficients of the polynomial are changed by the program and the output is checked again. The process is repeated until the output of the adaptive polynomial network is equal to the output of the simulator within specified limits. Various optimization techniques are utilized in the training process. For example, a gradient search technique for fitting the data base would work.

Once the final form of the adaptive polynomial network has been determined, "on-line testing" is carried out with the network replacing the guidance computer. Good correspondence of the adaptive network with the behavior of the actual guidance computer was achieved.

The particular final form of the adaptive polynomial network is not unique. The number of layers chosen and exactly which coefficients are selective by the training program can be different for different adaptive polynomial networks that model the actual physical system reasonably well. Too many layers can result in a phenomenon known as "overfitting." There are criteria and tests to prevent overfitting and to arrive at an optimum number of layers for the adaptive network.

As a further indication of the validity of biological analogies to adaptive polynomial networks, a machine embodiment in accordance with the present invention can be seen to emulate an essentially biological attribute such as the ability to infer. No explicit interpolation or reconstruction is involved in the present invention; rather, the "trained" network infers the effects of a continuously missing array of inputs and generates the outputs autonomously. This is a significant departure from the prior art. No memory units, no comparators, and no interpolators are involved. The method of the present invention could result in the construction of a truly general-purpose machine which would be adaptable to diverse applications.

In dramatic contrast to previous used of polynomial networks, the present invention permits the inference of several missing inputs on a continuous basis, not just as a stopgap measure when plant or signal interruption occurs. The present invention permits a simplified design structure to be realized for many multi-input/multi-output systems. The missile guidance computer used as an example in this application may now be designed with fewer required input parameters, resulting in design simplification and in reduction of hardware costs, weight, and size. In addition, missile tactical performance is improved in hostile scenarios such as those involving jamming and other countermeasures.

Although there has been described above one specific arrangement of an inference machine using adaptive polynomial networks in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

Referring to FIG. 3, the linear smoothing filter 16 is expressed by the relationship:

$$I'(t) = W_1 I(t - 9T) + W_2 I(t - 8T) +$$
$$W_3 I(t - 7T) + W_4 I(t - 6T) +$$
$$W_5 I(t - 5T) + W_6 I(t - 4T) + W_7 I(t - 3T) + W_8 I(t - 2T) +$$
$$W_9 I(t - T) + W_{10} I(t)$$

where $I'(t)$ is the filtered output and I is the noisy input. $W_1, W_2, W_3, \ldots, W_{10}$ are constant real numbers. T is the sampling time interval in seconds. $I(t-nT)$ respresents the value of the input signal at n times seconds in the past.

In layer #1 there are four blocks. The inputs $I_1'$, $I_2'$, $I_3'$, $I_4'$, to these blocks are sampled and the discrete values are numbered as $x_1, x_2, x_3, \ldots, x_{30}$ in accordance with the following sequential relationships. T represents sampling interval in seconds.

| | | |
|---|---|---|
| $x_1 = I_1'(t)$ | $x_{11} = I_1'(t-20T)$ | $x_{21} = I_2'(t-384T)$ |
| $x_2 = I_1'(t-T)$ | $x_{12} = I_1'(t-32T)$ | $x_{22} = I_3'(t)$ |
| $x_3 = I_1'(t-2T)$ | $x_{13} = I_2'(t)$ | $x_{23} = I_3'(t-T)$ |
| $x_4 = I_1'(t-3T)$ | $x_{14} = I_2'(t-T)$ | $x_{24} = I_4'(t)$ |
| $x_5 = I_1'(t-4T)$ | $x_{15} = I_2'(t-2T)$ | $x_{25} = I_4'(t-T)$ |
| $x_6 = I_1'(t-6T)$ | $x_{16} = I_2'(t-3T)$ | $x_{26} = I_4'(t-2T)$ |
| $x_7 = I_1'(t-7T)$ | $x_{17} = I_2'(t-4T)$ | $x_{27} = I_4'(t-4T)$ |

-continued

| | | |
|---|---|---|
| $x_8 = I_1'(t-8T)$ | $x_{18} = I_2'(t-6T)$ | $x_{28} = L_4'(t-8T)$ |
| $x_9 = I_1'(t-12T)$ | $x_{19} = I_2'(t-8T)$ | $x_{29} = L_4'(t-16T)$ |
| $x_{10} = I_1'(t-16T)$ | $x_{20} = I_2'(t-256T)$ | $x_{30} = L_4'(t-44T)$ |

The input-output relationships of layer #2 are given by $$z_i = a_i + b_i x_i, \; i = 1, 2, 3, \ldots, 30$$

where the $x_i$ and the $z_i$ are the inputs and outputs to this layer, respectively. The $a_i$ and $b_i$ are specified real numbers.

Similarly, output $z^{31}$ of layer #3 is given by $$c_1 z_1 + c_2 z_2 + \ldots + c_{29} z_{29} + c_{30} z_{30}$$

Layers #4, 5, and 6 have outputs which may be expressed as $$z_{32} = d_1 * z_{31} + d_2 * z_{15} * z_{16}$$

$$z_{33} = e_1 * z_{32} + e_2 * z_{32} * z_{25} + e_3 * z_{25} * z_{28}$$

$$\text{Output \#1} = f_1 + f_2 * z_{33}$$

where "*" denotes multiplication and, as before, $d_1$, $d_2$, $e_1$, $e_2$, $e_3$, $f_1$, and $f_2$ are specified numbers.

The mathematical structures of the second channel (Output 2) are identical although, depending upon the interaction of the two channels, the coefficient values could be different.

What is claimed is:

1. A method for constructing an inference machine for simulation of behaviour of a physical system within predetermined limits of accuacy when said inference machine has fewer independent inputs than said physical system, comprising the steps of:

(a) designing an adaptive polynomial network having a layered structure of linearly transforming elements acting on time dependent signals arriving at a plurality of independent inputs, with successive layers of said structure making use of selected outputs of intermediate layers which have the most influence on said accuracy of simulation, and each said element having one or more numerical coefficients and a time delay of zero or greater associated therewith;

(b) simulating said physical system with a digital computer;

(c) amassing a "training" data set of simulated output values from the computer simulation of said physical system in response to input values;

(d) running a training program of software instructions which operates on said training data set to produce a plurality of optimized values of said coefficients for said polynomials in said polynomial network, and to select a subset of values of said outputs of intermediate layers of said polynomial network which have the most important influence on said accuracy of simulation by said adaptive polynomial network of said physical system; and (e) implementing said adaptive polynomial network in hardware.

2. An inference machine comprising a polynomial network having an identical number of outputs as a system which said network models but a reduced number of independent inputs, wherein said network yields, within predetermined limits, the same output values as said system for the same input values of said reduced number of independent inputs, said network comprising;

a noise-reducing layer of smoothing filters having a plurality of smoothed outputs and a plurality of inputs equal in number to said reduced number of independent inputs;

a first layer of transformational elements connected in parallel, each said first-layer element having one of said smoothed outputs as an input and a plurality of outputs of sampled and stored values of said one smoothed input;

a second layer of linear transformational elements connected in parallel, one for each said first-layer element, each said second-layer element comprising means of linearly transforming a predetermined number of said first-layer output values into an identical number of output values according to one specified linear transformational equation; and a plurality of sequential layers of transformational elements following said second layer, each said element in said sequential layers comprising means for linearly transforming a different predetermined combination of outputs from earlier layers into an output according to a particular specified linear transformational equation, with a last layer of said plurality of layers producing output values which are the same, within predetermined limits, as said system which said network models.

3. The inference machine of claim 2 wherein said network models the guidance computer of a missile, said guidance computer requiring ten inputs and said network requiring only four.

4. The inference machine of claim 3 wherein each smoothing filter follows the relationship:

$$I'(t) = W_1 I(t - 9T) + W_2 I(t - 8T) +$$
$$W_3 I(t - 7T) + W_4 I(t - 6T) +$$
$$W_5 I(t - 5T) + W_6 I(t - 4T) + W_7 I(t - 3T) + W_8 I(t - 2T) +$$
$$W_9 I(t - T) + W_{10} I(t).$$

where $I'(t)$ is a filtered output, I is a noisy input, W through $W_{10}$ are constant real numbers, T is a sampling time interval, and $I(t-nT)$ represents the value of the input signal at $n \times T$ seconds in the past.

5. The inference machine of claim 3 wherein said outputs of said transformational elements in said first layer are related to said inputs of said transformational elements in said first layer by:

| | | |
|---|---|---|
| $x_1 = I_1'(t)$ | $x_{11} = I_1'(t-20T)$ | $x_{21} = I_2'(t-384T)$ |
| $x_2 = I_1'(t-T)$ | $x_{12} = I_1'(t-32T)$ | $x_{22} = I_3'(t)$ |
| $x_3 = I_1'(t-2T)$ | $x_{13} = I_2'(t)$ | $x_{23} = I_3'(t-T)$ |
| $x_4 = I_1'(t-3T)$ | $x_{14} = I_2'(t-T)$ | $x_{24} = L_4'(t)$ |
| $x_5 = I_1'(t-4T)$ | $x_{15} = I_2'(t-2T)$ | $x_{25} = L_4'(t-T)$ |
| $x_6 = I_1'(t-6T)$ | $x_{16} = I_2'(t-3T)$ | $x_{26} = L_4'(t-2T)$ |
| $x_7 = I_1'(t-7T)$ | $x_{17} = I_2'(t-4T)$ | $x_{27} = L_4'(t-4T)$ |
| $x_8 = I_1'(t-8T)$ | $x_{18} = I_2'(t-6T)$ | $x_{28} = L_4'(t-8T)$ |
| $x_9 = I_1'(t-12T)$ | $x_{19} = I_2'(t-8T)$ | $x_{29} = L_4'(t-16T)$ |
| $x_{10} = I_1'(t-16T)$ | $x_{20} = I_2'(t-256T)$ | $x_{30} = L_4'(t-44T)$ | where $I_1'(t)$ through $L_4'(t)$ represent said inputs, $x_1$ through $x_{30}$ represent said outputs, and T represents a sampling time interval.

6. The inference machine of claim 3 wherein said outputs of said second layer of linear transformational elements are related to said inputs of said linear transformational elements by:

$$z_i = a_i + b_i x_i, \quad i = 1, 2, 3, \ldots, 30,$$

where the $x_i$ and the $z_i$ are said inputs and outputs to said second layer, respectively, and $a_i$ and $b_i$ are specified real numbers.

7. The inference machine of claim 3 wherein said plurality of sequential layers of transformational elements following said second layer comprises four layers.

8. The inference machine of claim 7 wherein an output $z_{31}$ of a first of said four layers in said plurality of sequential layers is given by $$c_1 z_1 + c_2 z_2 + \ldots + c_{29} z_{29} + c_{30} z_{30},$$

where $c_1$ through $c_{30}$ are specified real numbers and $z_1$ through $z_{30}$ are said inputs.

9. The inference machine of claim 8 wherein a remaining three layers of said plurality of sequential layers have outputs which may be expressed as $$z_{32} = d_1 * z_{31} + d_2 * z_{15} * z_{16}$$

$$z_{33} = e_1 * z_{32} + e_2 * z_{32} * z_{25} + e_3 * z_{25} * z_{28}$$

$$\text{Output } \#1 = f_1 + f_2 * z_{33},$$

where a "*" denotes multiplication; $d_1$, $d_2$, $e_1$, $e_2$, $e_3$, $f_1$, and $f_2$ are specified numbers; and Output #1 is a first output of said inference machine.

10. The inference machine of claim 9 wherein each said element comprises an electronic analog device.

11. The inference machine of claim 9 wherein each said element of said adaptive polynomial network comprises an electronic digital device.

12. The inference machine of claim 9 wherein said adaptive polynomial network is implemented on a microprocessor chip.

* * * * *